United States Patent

[11] 3,590,157

[72] Inventor Adrianus Korpel
  Prospect Heights, Ill.
[21] Appl. No. 797,783
[22] Filed Feb. 10, 1969
[45] Patented June 29, 1971
[73] Assignee Zenith Radio Corporation
  Chicago, Ill.

[54] LASER DISPLAY SYSTEM HAVING WIDE DEFLECTION ANGLE
  6 Claims, 5 Drawing Figs.
[52] U.S. Cl. .................................................. 178/7.5,
  350/161, 310/8.1, 250/199
[51] Int. Cl. .................................................. H04n 3/06
[50] Field of Search ........................................... 178/7.3 D,
  7.5 D, 6 SP; 350/160, 161; 310/8.1; 250/199

[56] References Cited
UNITED STATES PATENTS

| | | | |
|---|---|---|---|
| 3,363,117 | 1/1968 | Mondot et al. ................ | 310/8.1 |
| 3,383,627 | 5/1968 | Desmares ...................... | 250/199 |
| 3,493,759 | 2/1970 | Adler ............................ | 250/199 |

Primary Examiner—Robert L. Griffin
Assistant Examiner—Donald E. Stout
Attorney—Francis W. Crotty ABSTRACT: A display system includes a beam of light that is repetitively deflected through a scanning pattern so as to define one line of an image raster. The beam deflection is a result of diffractive interaction of the beam with a train of acoustic waves that change in frequency repetitively through a range of frequencies and which are developed by a source of signals that correspondingly changes frequency repetitively. A transducer responds to those signals to develop the acoustic waves and has an input at which a capacitive reactance is presented; the effect of that reactance is to diminish the response of the transducer to the applied signals. In order at least partially to compensate that capacitive reactance, a matching network is coupled between the source and the input and includes an element which has an adjustable reactance. This element may be a saturable reactor or the like controlled so that its reactance is varied automatically to its compensatory value at each frequency as the signals change in frequency throughout their range.

PATENTED JUN 29 1971 3,590,157

Inventor
Adrianus Korpel
By Francis W. Crotty
Attorney

LASER DISPLAY SYSTEM HAVING WIDE DEFLECTION ANGLE

BACKGROUND OF THE INVENTION

The present invention pertains to light-beam deflection apparatus. More particularly, it relates to a system for deflecting a beam of light by virtue of its interaction with acoustic waves. As utilized herein, the term "light" includes electromagnetic radiation in both the visible and invisible portions of the spectrum and the terms "acoustic" and "sound" pertain to acoustic waves in both the audible and super-audible ranges.

As disclosed in my copending application Serial No. 600,430 filed Dec. 9, 1966, and in a number of other applications referred to therein, a beam of light from a source, such as a laser, may be modulated with intelligence information by propagating sound waves representative of the modulation across the beam to cause diffraction of the light by the sound wave fronts In this manner, the diffracted light is modulated in intensity in accordance with video signals modulated upon the sound energy. Somewhat similarly, by varying the frequency of the sound waves propagated across the path of the light beam, the beam may be caused to be deflected or scanned in a given direction across an image plane. By including means for effecting scanning of the beam in the orthogonal direction, a complete image raster may be defined.

The interaction between the sound or acoustic waves and the light beam occurs in a wave-propagating medium that may be either a liquid, such as water, or a solid such as glass. In any event, a transducer is coupled to the propagating medium and in the case of the light-deflection portion of the image display system, responds to an electric deflection or sweep signal to produce the traveling acoustic waves in the wave propagating medium. The sweep signal changes frequency repetitively throughout a range of frequencies as a result of which the wavelength of the acoustic waves is constantly changing; this, in turn, means that the angle of diffraction of the light beam likewise is constantly changing and the beam is thereby repetitively scanned throughout a given range of deflection angles.

Generally speaking, any particular transducer exhibits a maximum response only at some particular frequency. That is, there is only one deflection signal frequency at which, in response to a sweep signal of given amplitude, a maximum amplitude of the resulting acoustic wave is produced. To the end of providing a comparatively high amplitude response over a wide band of deflection signal frequencies, the transducer first of all is coupled to the propagating medium by an impedance-matching structure. One suitable matching arrangement for this purpose is disclosed in the copending application of Robert Adler, Ser. No. 600,500, now U.S. Pat. 3,493,759, filed Dec. 9, 1966.

At the same time, however, it also has been necessary to include an impedance-matching network between the sweep signal source and the input to the transducer so as to attain an adequate signal transmission level of the sweep signals delivered to the transducer over a comparatively wide range of sweep signal frequencies. To this end, electronic circuits that include a somewhat complex arrangement of transistors and inductors have been devised in order to obtain a reasonable operating bandwidth. Some of these approaches are extremely inefficient and thus require excessively high input power levels, while others place severe limitations upon the combinations of materials that may be utilized as transducing elements and propagating mediums. Such restrictions on useable materials in turn limit the deflection angles available at different frequencies.

It is a general object of the present invention to provide a transducing system that overcomes the aforenoted disadvantages and difficulties.

Another object of the present invention is to provide a new and improved transducing system of the aforegoing character in which a wide bandwidth is exhibited.

A further object of the present invention is to provide such a transducing system which is capable of employing a wide variety of different materials in constructing the various components of the system.

SUMMARY OF THE INVENTION

The invention is utilized in an environment in which a beam of light is repetitively deflected through a scanning pattern by reason of diffractive interaction with a train of acoustic waves that change in frequency repetitively through a range of frequencies. To launch such acoustic waves, a transducing system is provided which includes a source of signals that repetitively change in frequency throughout the aforementioned range. Responding to those signals is a transducer that develops the acoustic waves but which has an input at which a capacitive reactance is presented the effect of which is to diminish the response of the transducer to signal frequencies within the operating range. Coupled between the deflection-signal source and the input of the transducer is a matching network that includes an element the reactance of which is adjustable to at least partially compensate the aforesaid capacitive reactance. Finally, the system includes means for adjusting the reactance of that element automatically to its compensatory value at each frequency as the frequency of the deflection signal changes throughout the operating range of frequencies.

DESCRIPTION OF PREFERRED EMBODIMENTS

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

Figure 1:
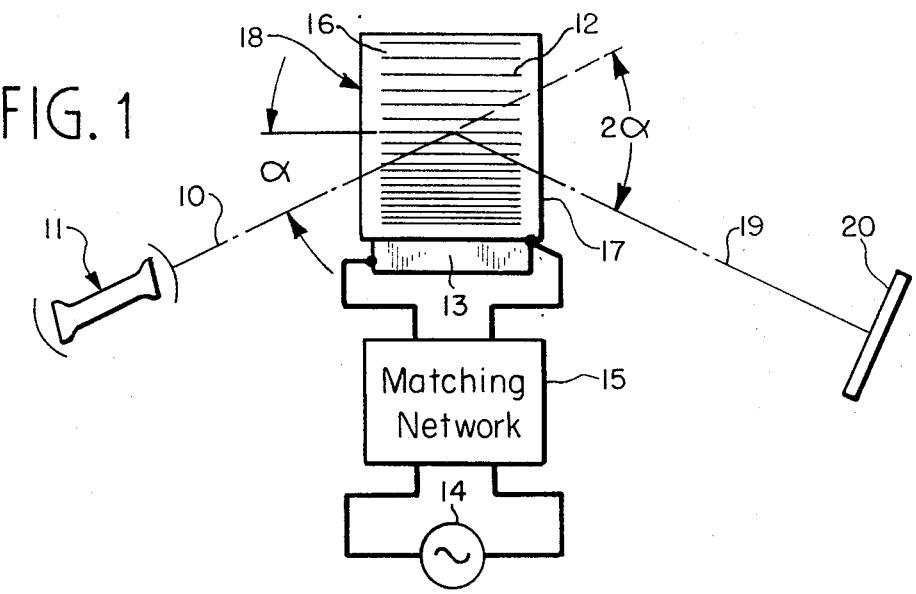
FIG. 1 is a schematic diagram of a light-sound interaction scanning system.

Because previously mentioned application Ser. No. 600,430 and numerous publications have so thoroughly described the principles involved in and the various apparatus for accomplishing the repetitive deflection of a light beam by a means of diffractive interaction with sound waves, the system shown in FIG. 1 includes only certain of the most elemental components. Thus, a beam 10 of light having a wavelength $\lambda$ is produced by a laser 11. Propagating across the path of beam 10 are a series of sound waves 12 launched by a transducer 13 driven from a signal source 14 through a matching network 15. The sound waves of wavelength $\Lambda$ in a typical embodiment propagate in a medium 16 confined within an enclosure 17 having sidewalls transparent to the light in beam 10. The entire sound propagating assembly, here designated 18, is frequently referred to as a sound cell.

When light beam 10 is incident upon the sound wave fronts approximately at the Bragg angle $\alpha$, a portion of the light beam emerging from cell 18 is diffracted along a path 19 forming an angle with the undiffracted beam portion of $2\alpha$. Bragg angle $\alpha$ is determined in accordance with a relationship:

$$\sin \alpha = \pm \lambda / 2\Lambda. \tag{1}$$

In a typical application, the actual value of angle $\alpha$ is sufficiently small that the left term in this equation is simply the angle $\alpha$ itself.

The diffracted light in beam 19 is projected upon an image screen 20. As will be evident from an examination of the above equation, the value of the diffraction angle is a function of the wavelength (or frequency) of the sound waves and, hence, is correspondingly a function of the frequency of the signals generated by source 14. As the sound wavelength decreases, the diffraction or deflection angle increases. Consequently, by scanning the sound frequency repetitively through a range, the light beam is caused repeatedly to scan across image screen 20. Utilizing this approach, and concurrently intensity modulating the light beam in accordance with the amplitude of a video signal, causes the video information to be displayed in terms of light image elements spread out across screen 20 in a line.

In accordance with conventional television practice, the light beam scansion may be synchronized with the development of the video information by a television camera. Of course, to produce an actual television display in this manner, the system also includes means for deflecting light beam 19 in a directional orthogonal to the scanning direction illustrated in FIG. 1 so that a complete image raster is defined. However, for purposes of disclosing the essential elements of the system under discussion, it is necessary to consider in detail only the manner of display with the respect to one of the two orthogonal directions.

In a typical embodiment in which the center frequency $f_o$ of the sweep signals from source 14 is 30 megahertz, the total frequency swing $\Delta f$ of that sweep signal is 16 megahertz. As a result, the deflection angle of beam 19 is 6.8 milliradians and this angle typically is magnified at least 15 times by a telescope placed in the path of beam 19. Such a system exhibits an image resolution of approximately 200. By doubling the total frequency swing $\Delta f$, an image resolution of 400 is obtainable, corresponding to the level of resolution found in conventional television receiver image displays. For ease of obtaining and handling that large a frequency range, the center frequency $f_o$ preferably is also at least doubled. Moreover, as the sound frequencies thus are increased it becomes desirable to employ a higher-density material for the sound-propagating medium, since otherwise the efficiency with which those waves are launched and propagated unduly declines. A typical material satisfactory for use as a propagating medium at such higher frequencies, for example, with center frequency $f_o$ at 60 or even 100 megahertz, is glass. However, a change of the sweep-frequency range to higher frequencies is attended by a deterioration in transducing performance in conventional systems. An analysis of the electrical characteristics of transducers together with a discussion of certain conventional matching techniques will reveal the reasons for this deterioration.

Figure 2:
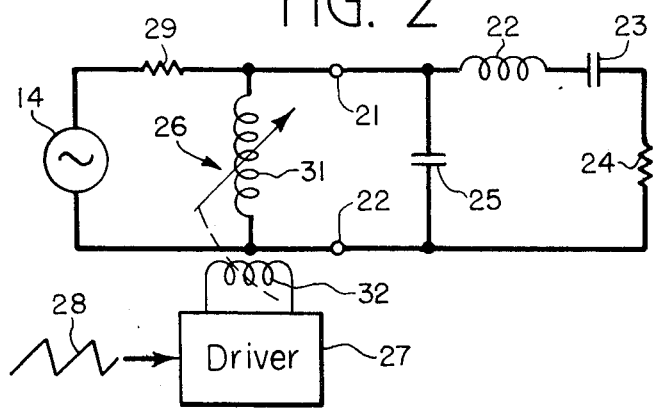
FIG. 2 is a schematic diagram of a portion of the system of FIG. 1.
Figure 3:
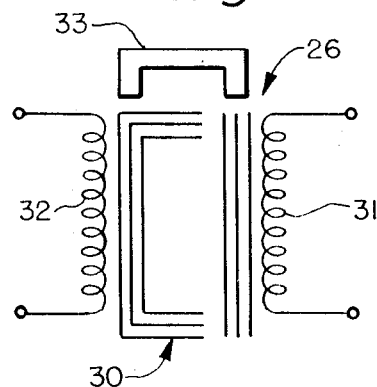
FIG. 3 is a schematic diagram of a component employed in the network of FIG. 2.

In general, the approach has been to use a transducer of a material such as the ceramic PZT that exhibits a high coupling factor. In this way, a large bandwidth, of say better than 50 percent of center frequency, may be obtained by the use of passive coupling networks. However, such a transducer material at the same time becomes increasingly inefficient as a transducer as the frequency is increased. Most, if not all, such transducers are useless at frequencies above 100 megahertz. FIG. 2 includes a representation of the equivalent electrical circuit of a piezoelectric transducer of the kind utilized in the system of FIG. 1 to launch the acoustic waves. The transducer is connected between terminals 21 and 22 and its equivalent circuit includes the series combination of an inductor 22, a capacitor 23 and a resistor 24 connected between terminals 21—22 in parallel with a capacitor 25. As is well known, capacitor 25 is the input shunt capacitance presented by the transducer to terminals 21—22. Capacitor 23 is an equivalent capacitance representing the compliance of the transducer, inductor 22 is an equivalent inductance that is a function of the mass of the transducer and, in this case, resistor 24 is the electrical equivalent of the characteristic impedance to the acoustic waves presented by the medium to which the transducer is mechanically coupled, more specifically, medium 16 in FIG. 1. Inductor 22 and capacitor 23 exhibit a condition of series resonance at the frequency at which the transducer is mechanically resonant.

One known matching technique involves connecting an external inductor across terminals 21—22 that is parallel resonant with capacitor 25 at the transducer mechanical resonant frequency; that frequency, in turn, is chosen to be the center frequency $f_o$. Consequently the resulting network functions as what is known as a half section of a constant-K band-pass filter. Its bandwidth is a function of the values of both capacitors 23 and 25, and these in turn are dependent upon the particular material and mode of vibration of the piezoelectric element; normally, that bandwidth is equal to the coupling factor of the transducer when load 24 is suitably chosen. This approach requires that the load resistance represented by resistor 24 be at least approximately matched to the image impedance presented by the network. That impedance, in turn, depends on the mechanical impedance of the transducer material and its piezoelectric coupling factor; it is the product of these two quantities. Such a matching condition constitutes a severe restriction on the choice of the wave propagating medium to which the transducer might be coupled. For example, the simple addition of the external inductor yields a bandwidth of 10 percent (corresponding to a coupling factor of 0.1) when the active transducer element is an x-cut quartz crystal. A reasonably good match is obtained when the quartz transducer launches acoustic waves into a propagating medium having an impedance about ten times lower than that of the transducer itself. This latter condition is met reasonably well for such a crystal when water is the propagating medium. However, when the same quartz transducer instead is coupled to a glass propagating medium, the much higher load resistance presented by the glass results in a severe mismatch to the output of the filter network. In consequence, the system actually exhibits a much smaller matched bandwidth than the ten percent figure. Accordingly, the power transmission over the theoretical 10 percent bandwidth is very inefficient.

A converse result occurs when using the described prior matching network with a transducer element such as PZT that exhibits a comparatively high coupling factor. This kind of transducer correspondingly requires a high load impedance and effects efficient power transmission over a reasonable bandwidth only into a material such as glass. Only a few percent bandwidth can be realized when this type of element launches waves directly into a low-impedance medium such as water. As noted, such a transducer undesirably becomes very inefficient at the higher frequencies for which glass, in itself, is a suitable propagating medium.

The performance of the matching network thus-far described can be improved by a factor of .1414 with an additional series-resonant network composed of an inductor and a capacitor connected in series between the source of signals and one of terminals 21—22. Nevertheless, reasonably severe restrictions on the choice of different materials still remain.

It is to be emphasized that the foregoing references to bandwidth in connection with the filter network are in terms of that bandwidth over which efficient power transmission may be obtained from the source to the load. In a situation where a large amount of the signal power from source 14 may be wasted, a wide bandwidth can be obtained by direct connection of source 14 across terminals 21—22 and imposing the condition upon source 14 that it deliver its power at a constant voltage so as to simulate a zero internal impedance of the source. In that case, a large load resistance sufficiently reduces the Q of the series resonant circuit composed of inductor 22, capacitor 23 and resistor 24 that the desired large bandwidth is obtained; this, in effect, simulates the ideal case wherein the impedance of the propagating medium equals the impedance of the transducer. For example, a 100 percent bandwidth may be exhibited when utilizing the aforementioned x-cut quartz crystal coupled to a glass load. However, this arrangement becomes impractical with the conventional approach because approximately 99 percent of the available power delivered from the source is reactive and, therefore, is not transferred into the development of acoustic waves.

The limitations heretofore discussed may be reduced or avoided by further including in the system of FIG. 2 an element having an adjustable reactance to compensate at least partially the capacitance presented across terminals 21—22 by the transducer. To that end, an inductance device in the form of saturable reactor 26 is connected across terminals 21 and 22. Its reactance is adjusted by a control signal supplied from a driver amplifier 27 in response to applied synchronizing signals 28 which are in synchronism with the sweep signals from source 14. The control signals from driver 27 automatically change the reactance of reactor 26 to a value that compensates the capacitive reactance of the transducer at each frequency as the sweep signals change in frequency throughout their range of frequencies.

At the center frequency $f_o$ of the sweep range, reactor 26 may be thought of as operating like the external inductor discussed above so as to be in parallel resonance with capacitor 25 and thereby tune out the band-limiting effect of its capacitance. However, the reactance presented by reactor 26 is varied throughout the sweep range, under the influence of the control signal from amplifier 27, to continue tuning out the capacitance represented by capacitor 25 at every other frequency within the sweep range. Consequently, the problem of matching impedances so as to obtain low-Q operation, and thus a wide bandwidth, does not appear. That is, the network acts as if it were at the optimum-performance center frequency of the ordinary network at every frequency throughout the range.

Transducer materials such as quartz (a single crystal) that are useful at high frequencies but exhibit a low coupling factor may thus be utilized in connection with good high frequency wave-propagating materials. By tuning out, in a programmed manner, the reactance parameters that otherwise would limit bandwidth, the large load resistance of a material such as glass becomes fully, and yet not detrimentally, available for the purpose of lowering the overall Q and increasing the bandwidth. By using, or even approaching, an input signal source of constant voltage, the available bandwidth theoretically has no limit.

The system in question is admirably suited for use in connection with the display of image signals reproduced by a television receiver, because the signal from source 14 only has a single frequency at any given instant and that signal frequency changes in accordance with a preprogrammed schedule. Consequently, the necessary control signal for changing the reactance of reactor 26 may be in the form of a simple sawtooth waveform having a repetition rate the same as that of the signals from source 14 and synchronized to the latter by a conventional automatic-phase-control loop such as that which already exists in present-day television receivers.

In utilizing the complete system of FIG. 2, the acoustic wave propagating medium is selected to present a comparatively large load impedance to the transducer effectively to swamp out or reduce the Q of the series-resonant circuit represented by inductor 22, capacitor 23 and load resistor 24. As stated, the inductance of reactor 26 is programmed to tune out the effect of capacitor 25 at successively changed frequencies; the precise value of that inductance at any given frequency is selected also to correct for the presence of the series combination represented by inductor 22 and capacitor 23 at the different frequencies throughout the range. In consequence, an efficient match is available over a very broad band of frequencies between the internal source resistance 29 of source 14 and the load impedance, and that degree of efficiency is independent of the particular coupling factor of the transducer itself.

In one practical example, high power transmission efficiency is obtained over a bandwidth of approximately 100 percent of center frequency utilizing the aforementioned $x$-cut quartz crystal mechanically coupled to a glass wave propagating medium. That degree of power bandwidth significantly exceeds the bandwidth obtainable with the earlier-described fixed-component networks.

It has been indicated that transducers of ceramic materials such as PZT do permit the attainment of a respectable bandwidth when coupled to a medium such as glass. This occurs because such ceramic transducers exhibit dielectric losses that increase rapidly at higher frequencies. The dielectric loss increase is significantly less in natural crystals such as quartz. Consequently, the advanced technique described in connection with FIG. 2 permits the advantageous use of quartz or other natural crystals even at such high frequencies. Moreover, the single-crystal or natural transducers also are more easily fabricated to provide good surfaces capable of being adequately bonded to propagating mediums for high frequency use than is the case with polycrystalline ceramics. In addition, the described arrangement is applicable even above, say, 100 megahertz for use in connection with such transducer materials as cadmium sulfide and zinc oxide that advantageously may be formed on substrates by evaporation or chemical disposition.

A typical saturable reactor that may be employed in the FIG. 2 system includes a two-piece core 30 of magnetic material to which is coupled a controlled winding 31 and a controlling winding 32. Also included is a magnet 33 situated near core 30 for the purpose of presaturating the core to a selected initial level. It is controlled winding 31 that is connected between terminals 21—22 and presents to those terminals the compensating adjustable inductance.

Figure 4:
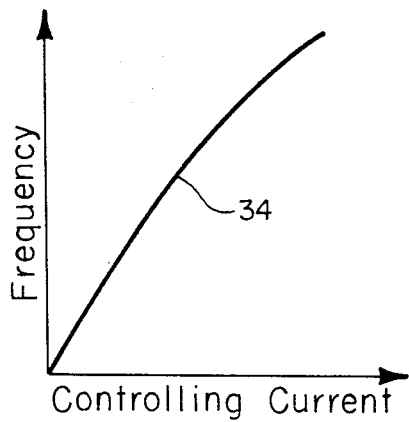
FIG. 4 is a plot exhibiting a control characteristic of the network of FIG. 2.

FIG. 4 illustrates a typical controlling current characteristic of such a saturable reactor. As the current applied to winding 32 from driver amplifier 27 is varied, the frequency to which the combination of reactor 26 and capacitor 25 is tuned also is varied as indicated by curve 34. The ordinate in FIG. 4 also may be interpreted in terms of the actual inductance directly presented by the reactor. Since driver amplifier 27 responds to the changing sawtooth potential of waveform 28 to change the current it supplies to winding 32, either the exact shape of the rising slope of the incoming sawtooth waveform or the transfer characteristic of amplifier 27 is tailored so that the actual inductance change of reactor 26, and hence the actual change of its frequency of parallel resonance with capacitor 25, is linear throughout the range of frequencies covered by the sweep signals from source 14. That is, controlling winding 32 serves as a bias upon the magnetic-saturation condition of core 30, in a manner which as such is well known, and the shape of the changing-current signal applied to that winding is selected so that, during the deflection sweep, the bias is changed to effect a linearly-changing compensating inductance.

Saturable reactors, or current-controlled inductors, are readily available in a wide variety of forms operable over diverse ranges. They may, for example, present inductances changeable over ranges in fractions of a microhenry or in many millihenries. They are operable in parallel with capacitances ranging from a few picafarads to a significant fraction of a microfarad for the purpose of resonating at frequencies from a few kilohertz to several hundred megahertz and over frequency ranges of as many as 60 megahertz. In general, it is preferred that reactor 26 exhibit a reasonably high Q and that it have a sufficient power handling capacity to accommodate the significantly high reactive power involved. Such characteristics are typical of conventionally-available saturable reactors.

Figure 5:
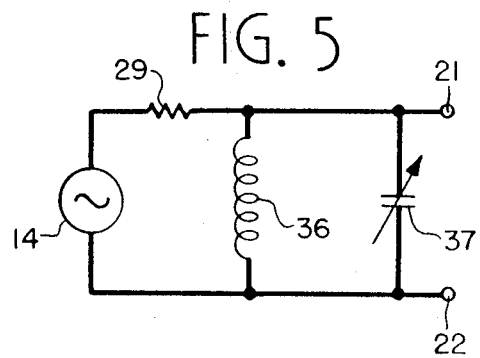
FIG. 5 is a schematic diagram of an alternative portion of the network of FIG. 2.

Illustrated in FIG. 5 is an alternative to the use of saturable reactor 26. In this case, terminals 21 and 22 are shunted by a fixed inductor 36 in parallel with a variable capacitor 37. Inductor 36 is chosen to have a reactance that compensates the capacitance represented by capacitor 25 at the highest sweep frequency. The size of capacitor 37 is then varied in synchronism with the change in sweep frequency so that the net reactance, of the combination of inductor 36 and capacitor 37, at each different sweep frequency is of a value to be in parallel resonance with and thus compensate capacitor 25. An advantage of utilizing a variable capacitor instead of a variable inductor is that its capacitance may be changed directly in response to a mere change of potential, as contrasted with the changing current required to control the saturable reactor. Reverse-biased solid-state diodes or varactors are well known to exhibit a change in their capacitance in response to an alteration of their reverse-biasing potential. Consequently, it is contemplated to utilize a plurality of series-parallel combinations of varactors in order to take advantage of integrated solid-state circuitry while yet affording the necessary power-handling capability.

Apparatus has been presented which enables efficient power transmission between a source of changing-frequency signals and a transducer coupled to an acoustic-wave-propagating medium. By taking advantage of a programmed change in the signal frequency to program in turn a change in a compensating reactance, the usually somewhat complex and more inefficient compensating networks may be omitted. In effect, a band-pass mode of operation is obtained by utilizing a single-frequency approach that is automatically changed as that frequency is changed. A significant result of the approach described is that much greater flexibility is afforded in the choice of the different materials that may be employed in both the transducer and the propagating medium.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a display system in which a beam of light is repetitively deflected through a scanning pattern by reason of diffractive interaction with a train of acoustic waves that change in frequency repetitively through a range of frequencies, a transducing system for launching said acoustic waves comprising:
   a source of signals repetitively changing in frequency throughout said range;
   a transducer responsive to said signals for developing said acoustic waves and having an input at which a capacitive reactance is presented the effect of which is to diminish the response of said transducer to said signals in said range;
   a matching network coupling said source to said input and including an element the reactance of which is adjustable to compensate at least partially said capacitive reactance;
   and means for adjusting the reactance of said element automatically to its compensatory value at each frequency as said signals change in frequency throughout said range of frequencies.

2. A system as defined in claim 1 in which said element is an inductor coupled in parallel with said capacitive reactance and the reactance of said inductor is varied in response to the change in frequency of said signals.

3. A system as defined in claim 2 in which said inductor comprises a saturable reactor having bias means the magnitude of which is varied in response to said change in frequency.

4. A system as defined in claim 3 in which said inductor exhibits a nonlinear frequency-change characteristic, in which said adjusting means responds to an applied control signal, and in which said matching network includes means for shaping said control signal to change the reactance of said inductor effectively linearly in proportion to said change in frequency.

5. A system as defined in claim 1 in which said element includes, in parallel with said capacitive reactance, the parallel combination of an inductor and a capacitor the capacitance of which is varied in response to the change of frequency of said signals.

6. A system as defined in claim 1 which displays a television image by means of said repetitive deflection effectively across an image raster, in which said television image is transmitted as the video portion of a composite television program signal and in which said composite signal includes a synchronizing component to which said source responds for synchronously developing said repetitively-changing signals.